United States Patent [19]

Hatamori et al.

[11] Patent Number: 5,036,346
[45] Date of Patent: Jul. 30, 1991

[54] ZOOMING APPARATUS FOR A VIEWFINDER OPTICAL SYSTEM

[75] Inventors: Osamu Hatamori; Yoshiaki Hata; Atsushi Sumitani; Haruo Kobayashi; Kinya Kato, all of Osaka, Japan

[73] Assignee: Minolta Camera Kabushiki Kaisha, Osaka, Japan

[21] Appl. No.: 465,966

[22] Filed: Jan. 16, 1990

[30] Foreign Application Priority Data

Jan. 17, 1989 [JP] Japan .................................. 1-9288
Jan. 30, 1989 [JP] Japan .................................. 1-21710

[51] Int. Cl.⁵ .......................... G03B 1/18; G03B 13/10
[52] U.S. Cl. ................................ 354/195.12; 354/199; 354/222
[58] Field of Search ........... 354/195.1, 195.11, 195.12, 354/199, 219, 222

[56] References Cited

U.S. PATENT DOCUMENTS

| 4,768,048 | 8/1988 | Wakabayashi | 354/195.12 |
| 4,771,303 | 9/1988 | Matsumoto et al. | 354/195.12 |
| 4,844,586 | 7/1989 | Suzuki et al. | 354/195.1 |

FOREIGN PATENT DOCUMENTS

60-112008 6/1985 Japan .
60-112009 6/1985 Japan .
62-265632 11/1987 Japan .

Primary Examiner—L. T. Hix
Assistant Examiner—Cassandra C. Spyrou
Attorney, Agent, or Firm—Joseph W. Price

[57] ABSTRACT

A camera having zoom lenses of a photographing optical system, zoom lenses of a viewfinder optical system, and a driving motor for driving both zoom lenses. A transmitting mechanism for transmitting the force of the driving motor to the zoom lenses of the viewfinder optical system having a gear train connected to the driving motor and a rotation cam which is provided coaxially with the last gear of the gear train to drive the zoom lenses of the viewfinder lens. A key projects from the end of the periphery of a rotation shaft included in the cam. The last gear is mounted around an end of the rotation shaft of the cam and has a key groove engaging the key. A play is provided between the key groove and the key. In carrying out a back focal distance compensation by reversing the driving motor a slight amount when a zooming operation is completed by moving the zoom lenses of the photographing optical system in a predetermined direction, a slight amount of the reverse rotation of the least gear of the gear train is absorbed by the play provided in the transmitting mechanism of the viewfinder optical system. Thus, the rotation cam is not rotated, i.e., the zoom lenses of the viewfinder optical system is not moved.

9 Claims, 12 Drawing Sheets

ZOOMING APPARATUS FOR A VIEWFINDER OPTICAL SYSTEM

BACKGROUND OF THE INVENTION

1. Field of the Invention

The present invention relates to a camera provided with a zoom lens and, more particularly, to a zooming mechanism for the viewfinder optical system of the camera.

2. Description of the related art

Recently, a compact and light camera having a simple construction, provided with a zooming function, has become commercially available. The photographing and viewfinder optical systems of the camera are constructed as independent optical systems in this kind of camera, i.e., both optical systems are respectively provided with independent zooming mechanisms. Therefore, when, for example, the zooming of the photographing optical system is carried out, the zooming of the viewfinder optical system is synchronously made.

According to the zooming operations to be performed by the photographing optical system of a known camera provided with a zoom lens, when the zoom lens is simply moved by a motor, the back focal distance is varied since the lens is located at slightly different positions between a lens forward zooming operation and a lens backward zooming operation. This is because the mechanism for transmitting the force of the motor to the zoom lens includes some play such as backlash between the gears. Accordingly, in order to prevent the back focal distance from being varied between a lens forward zooming operation and a lens backward zooming operation, the zooming mechanism of the photographing optical system is designed such that a back focal distance amount obtained, for example, in an operation for moving a zoom lens forward, is set to a reference, and a back focal distance compensation is performed in an operation for moving the zoom lens backward. According to the known method for compensating the back focal distance, when an operation for moving the lens in the non-reference direction has been completed, a motor for driving a zoom barrel and, accordingly, the zoom lens, is reversed for a short period of time so as to move the zoom lens in an opposite direction, i.e., the zoom lens is moved slightly in the reference direction. The photographing and viewfinder optical systems are interlocked with each other, i.e., both optical systems are driven by the above-mentioned motor so as to equalize the variation of the magnification of the photographing optical system and that of the viewfinder optical system to each other. Therefore, when the movement of the zoom lens of the photographing optical system is reversed, the zoom lens of the viewfinder optical system is moved in association with the movement of the zoom lens of the photographing optical system. That is, when the back focal distance compensating operation is performed by the zoom lens of the photographing optical system, the condition of an image viewed through the viewfinder is slightly varied irrespective of or against the intention of a photographer. Thus, the photographer cannot reliably use the camera provided with the zoom lens.

SUMMARY OF THE INVENTION

Accordingly, an essential object of the present invention is to provide an improved camera having a zoom lens which can overcome such disadvantages as described above, and to provide a zoom lens-provided camera having a viewfinder optical system provided with a zoom driving mechanism by which the condition of an image being viewed in the viewfinder of a viewfinder optical system can be prevented from changing due to a back focal distance compensation in a zooming operation of the photographing optical system.

In accomplishing this and other objects, according to one preferred embodiment of the present invention, a camera provided with a zoom lens has the following mechanism.

The camera comprises a photographing optical system having zoom lenses; a viewfinder optical system having zoom lenses; a driving motor for driving the zoom lenses of the photographing optical system and the viewfinder optical system; first driving force transmitting means for transmitting the force of the driving motor to the zoom lenses of the photographing optical system; back focal distance compensating means for compensating a back focal distance of the zoom lenses by reversing the driving motor slightly when an operation for moving the zoom lenses of the photographing optical system forward or backward is completed; and second driving force transmitting means for transmitting the force of the driving motor to the zoom lenses of the viewfinder optical system. The second driving force means includes a driving member constructed to operate in unison with the zoom lenses of the viewfinder optical system so as to move the zoom lenses, driving force transmitting members for transmitting the force of the driving motor to the driving member, a predetermined play having been provided between the driving member and the driving force transmitting member, and restraining means for restraining the driving member from freely rotating while allowing the driving member to be driven by the force of the driving motor, whereby a slight amount of the reverse rotation of the driving motor to be made in the back focal distance compensation of the zoom lenses of the optical system is absorbed by the play so that the operation of the driving member restrained by the restraining means is prevented.

According to a camera provided with the zoom lens of the present invention, if a zoom driving motor is reversed slightly in carrying out the back focal distance compensation of the zoom lens of the photographing optical system, the driving member of the zoom lens driving mechanism of the viewfinder optical system does not respond to the reverse rotation of the motor and consequently, is not rotated. That is, in the zoom driving mechanism of the photographing optical system, namely, in the second driving force transmitting means, a play is provided between the driving force transmitting member and the driving member and further, the restraining means, namely, the means for preventing the cam from rotating, acts on the driving member. Therefore, the driving force of the motor is not transmitted to the driving member even though the slight reverse rotation of the motor is transmitted to the driving force transmitting members in carrying out the back focal distance compensation of the zoom lens of the photographing optical system.

Accordingly, due to the above-described operation of the zoom lens-provided camera in accordance with the present invention, the zooming operation of the viewfinder optical system can be appropriately performed in unison with the zooming operation of the photographing optical system. Further, the zoom lens of the viewfinder optical system can be prevented from moving only when the back focal distance compensation of the zoom lens of the photographing optical system is made. Accordingly, when the back focal distance compensation of the zoom lenses is performed, the condition of an image being viewed in the viewfinder is not changed and a photographer can reliably use the camera.

BRIEF DESCRIPTION OF THE DRAWINGS

These and other objects and features of the present invention will become apparent from the following description, taken in conjunction with the preferred embodiment thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Figure 1:
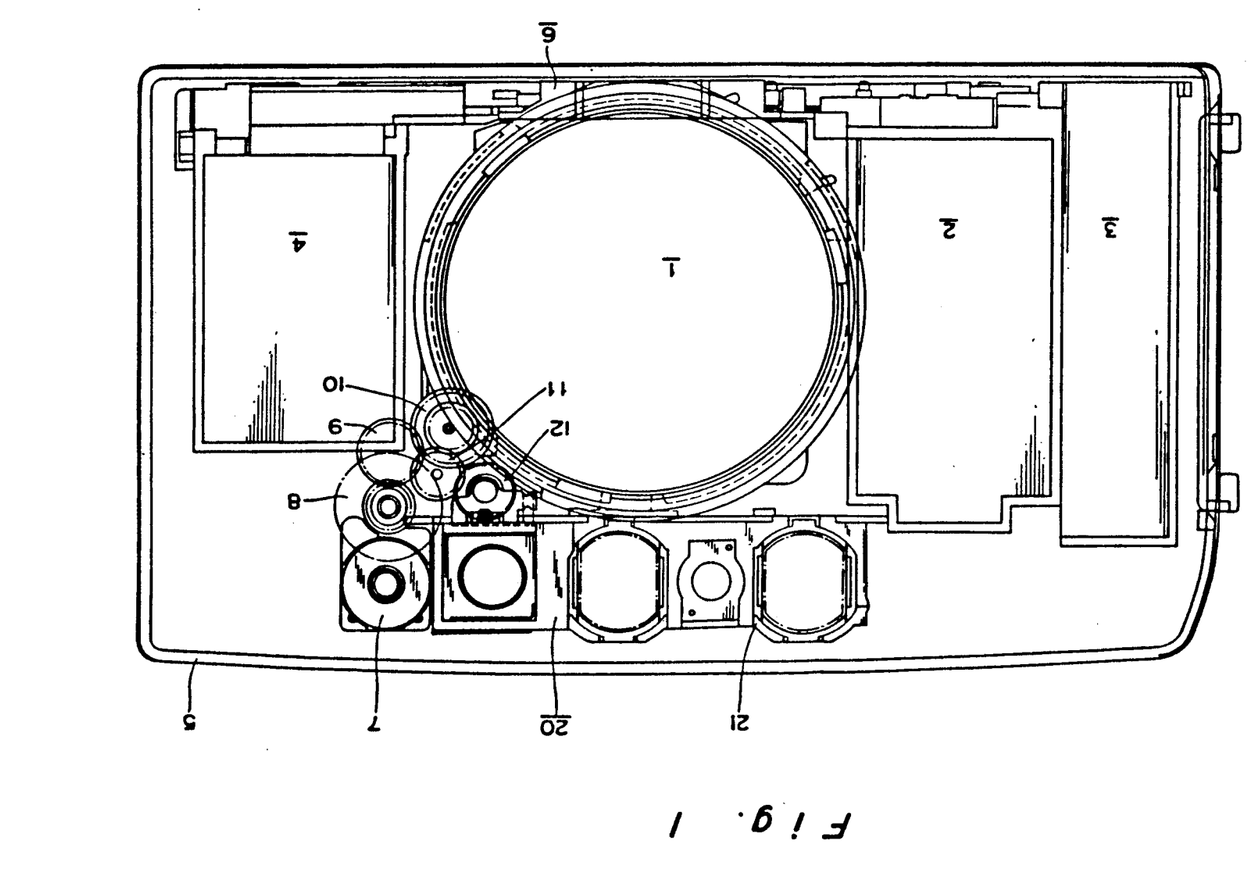
FIG. 1 is a front view showing a camera provided with a zoom lens according to an embodiment of the present invention which has a viewfinder block mounted in a camera body.

Referring now to the drawings, a camera provided with a zoom lens according to one preferred embodiment of the present invention is described hereinafter. FIG. 1 is a front view showing the position of a viewfinder block 20 mounted in a camera body provided with a zoom lens. A cover 5 covers respective sections which will be described hereinafter. A lens barrel 1 projects from the front face of the camera body. The lens barrel 1 comprises a barrel 6 fixed to the camera body and a zoom barrel (not shown) mounted in the barrel 6 so that the zoom barrel is movable along the axis thereof. There are formed on both sides of the barrel 6 a cartridge chamber 2 for accommodating a film cartridge and a spool chamber 4 for accommodating a film winding spool (not shown). A battery chamber 3 to accommodate a battery is formed on the side of the cartridge chamber 2. The viewfinder block 20 is arranged on the camera body and upward of the lens barrel 1, viewed in FIG. 1. A motor 7 for driving the zoom lens is disposed on the side of the viewfinder block 20. The driving force of the motor 7 is transmitted to the zoom barrel through a gear train consisting of gears 8, 9, and 10. The gear 10 and the gear 11 engage with each other. Therefore, the driving force of the motor 7 is also transmitted to a viewfinder lens driving system through a gear train consisting of gears 11 and 12. The viewfinder lens driving system will be described later.

Figure 2:
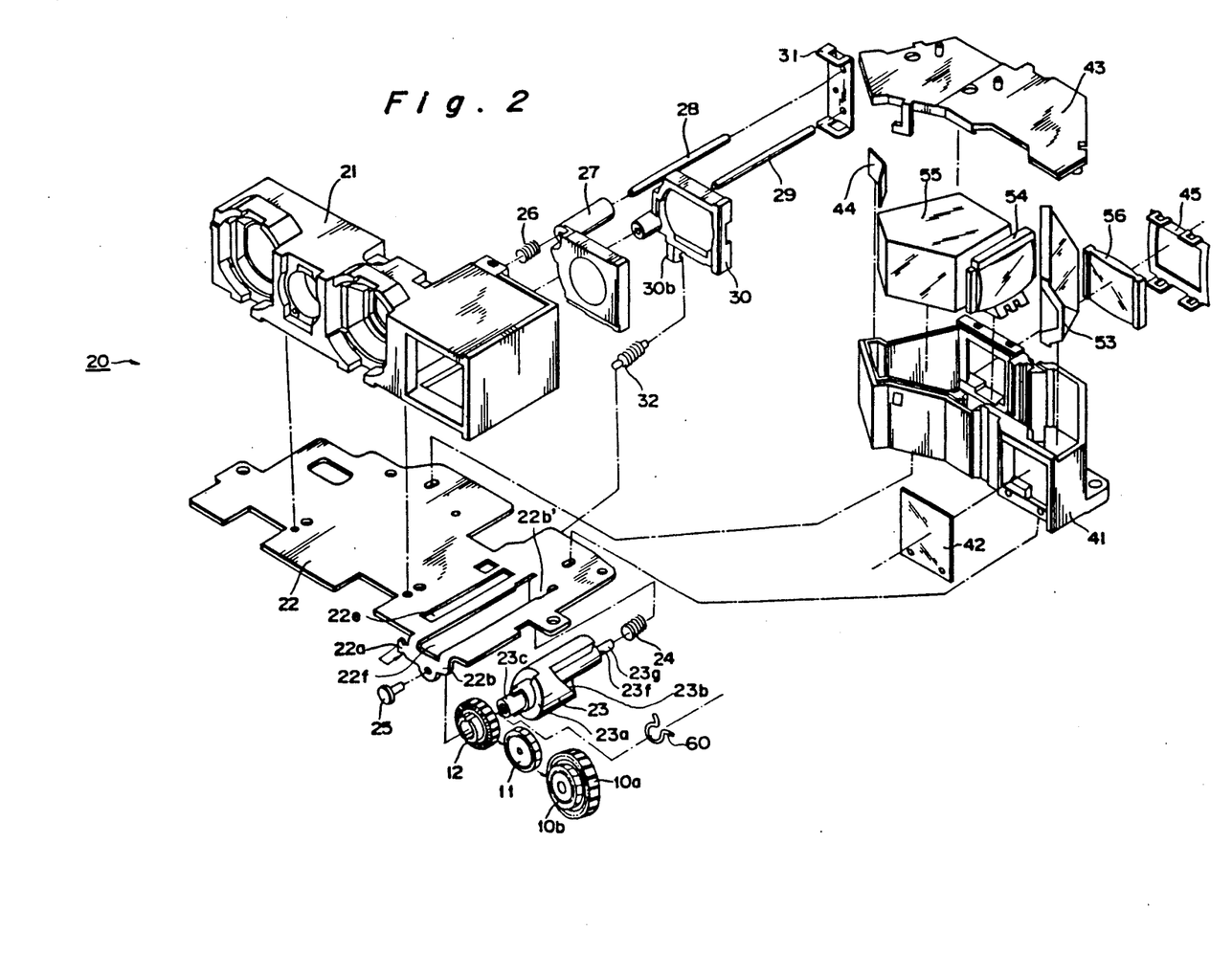
FIG. 2 is an exploded perspective view showing the detailed construction of the viewfinder block.
Figure 3:
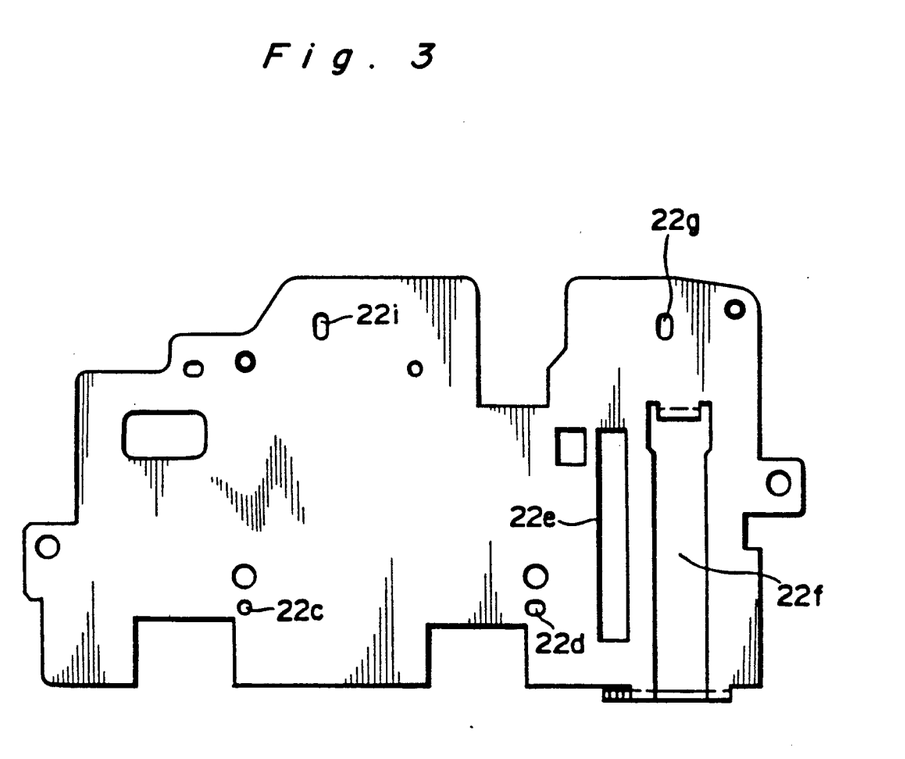
FIG. 3 is a plan view showing a viewfinder base included in the viewfinder block.
Figure 4:
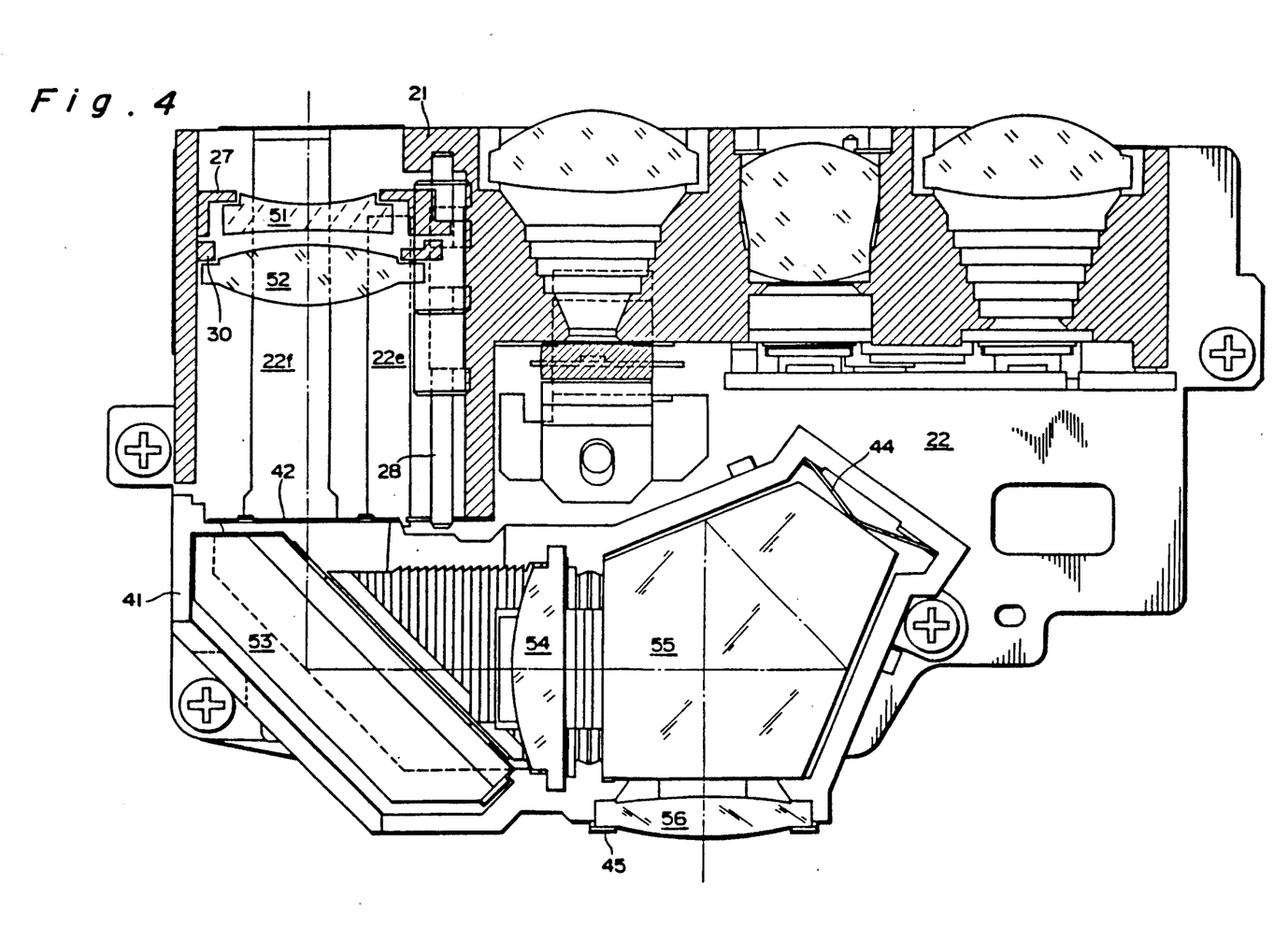
FIG. 4 is a view showing a first frame, partially in section, of a viewfinder block and a second frame from which a cover is removed.
Figure 5:
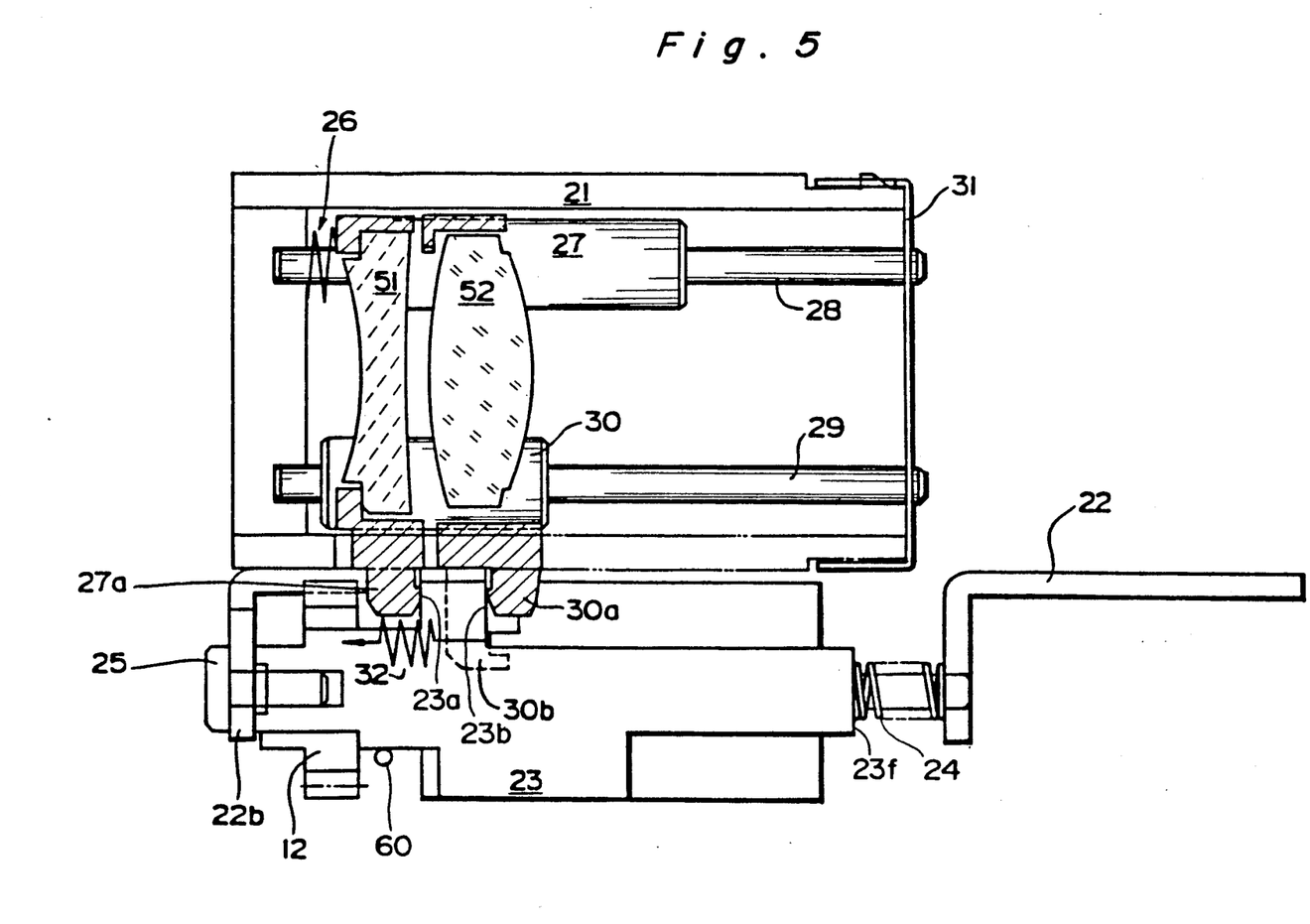
FIGS. 5 through 7 are vertical longitudinal sectional views showing the different operations of a system for driving viewfinder lenses.
Figure 6:
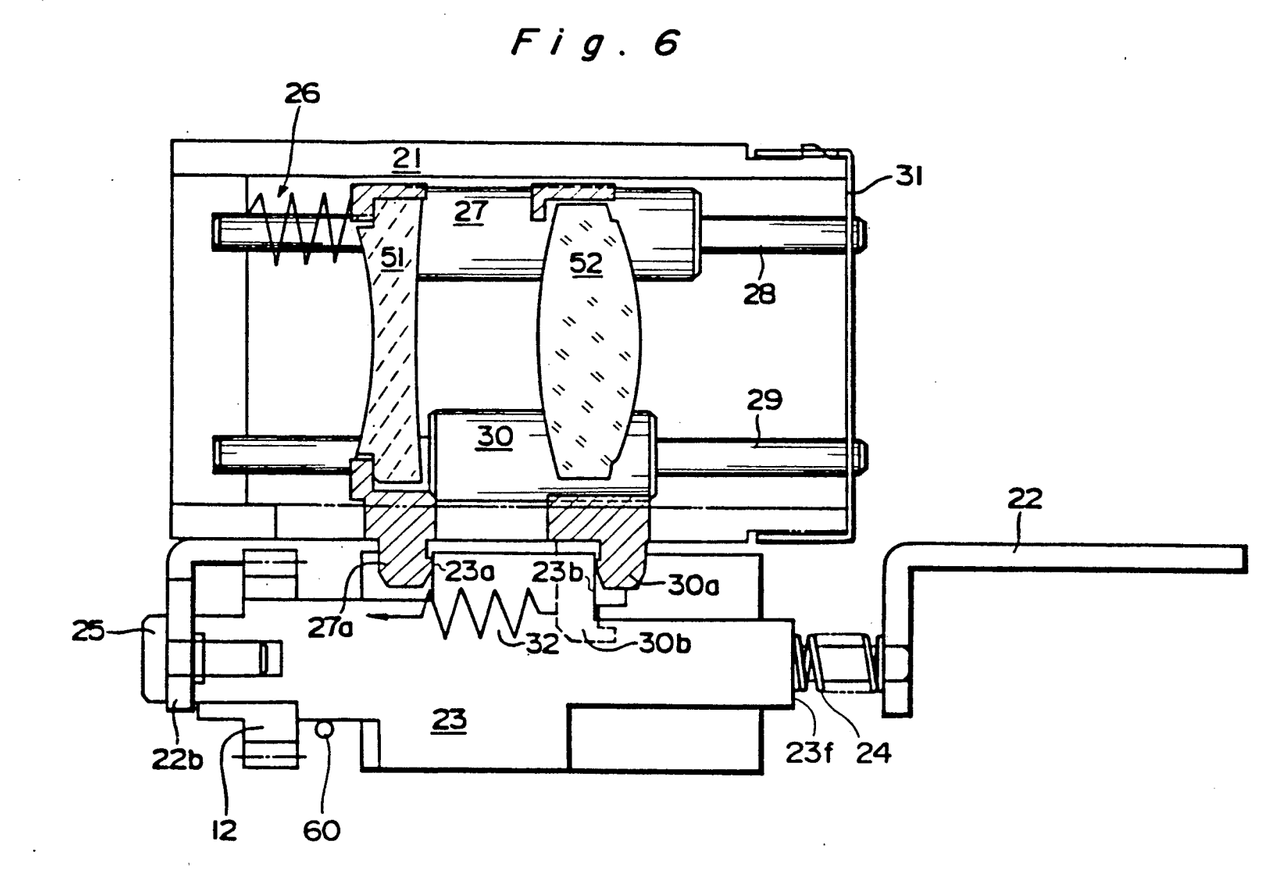
Figure 7:
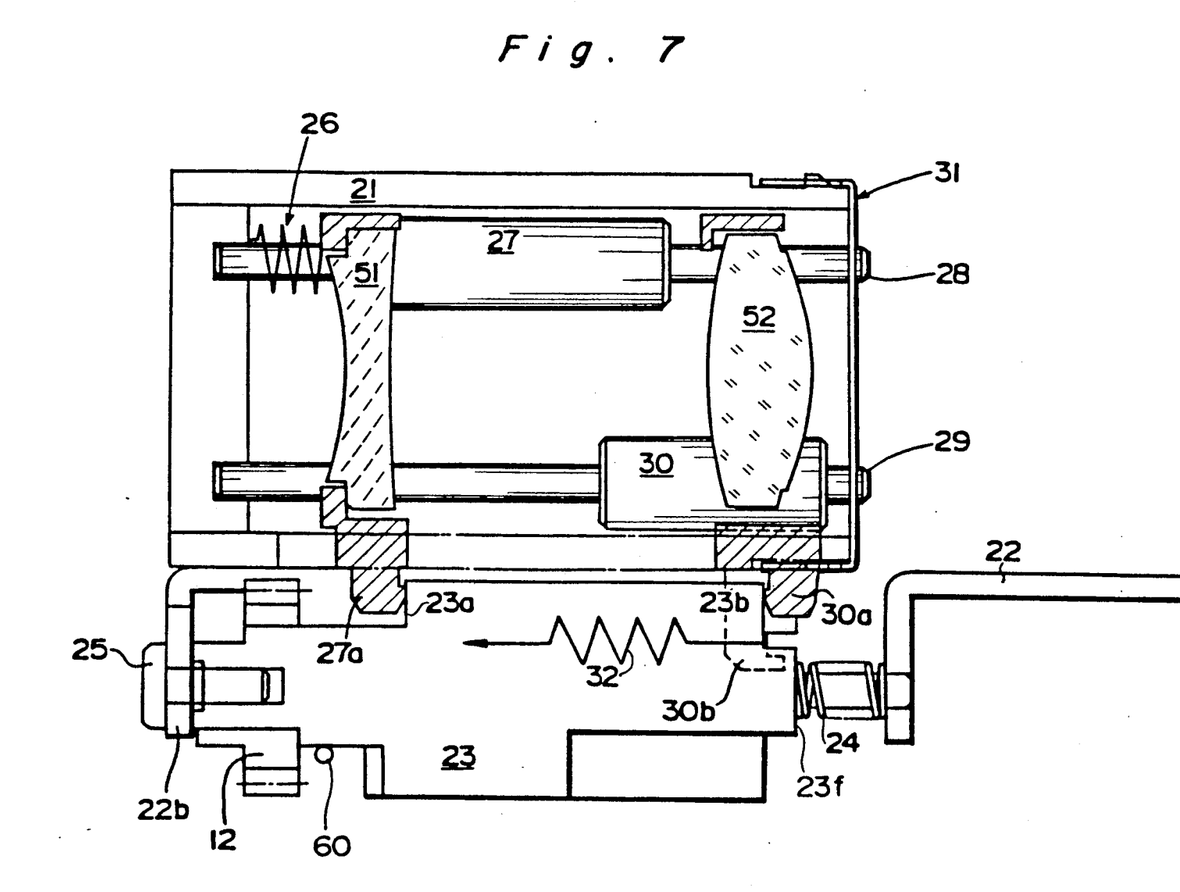
Figure 8:
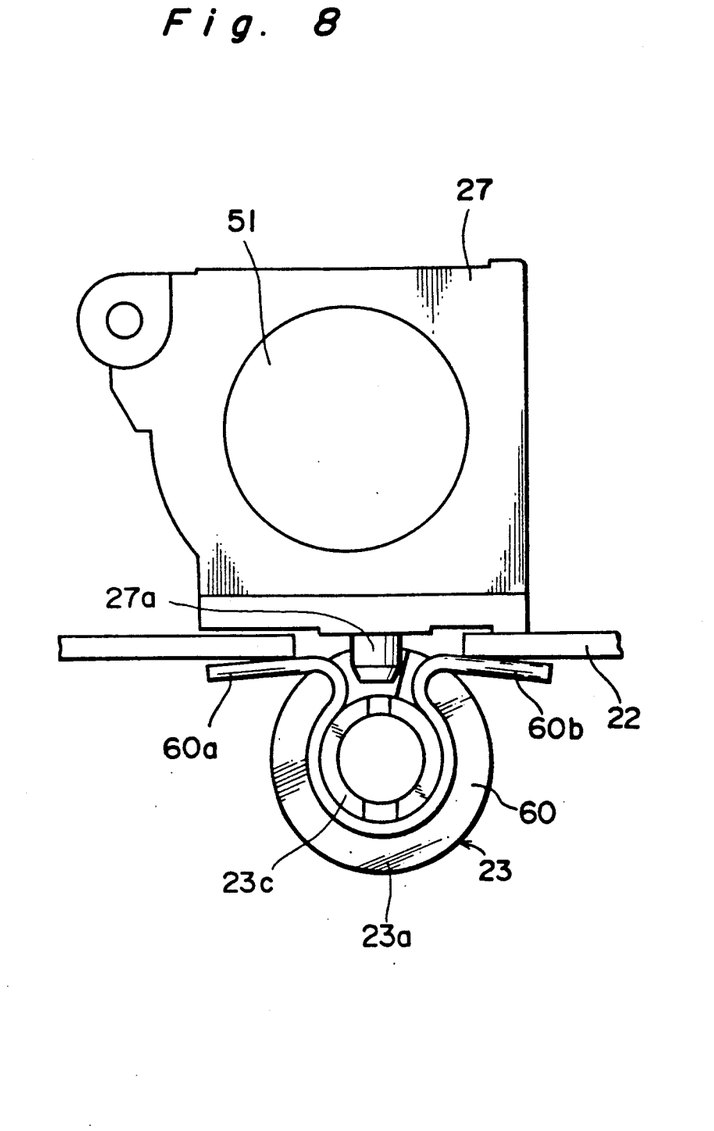
FIG. 8 shows a friction spring serving as friction means mounted on a viewfinder driving cam.
Figure 9A:
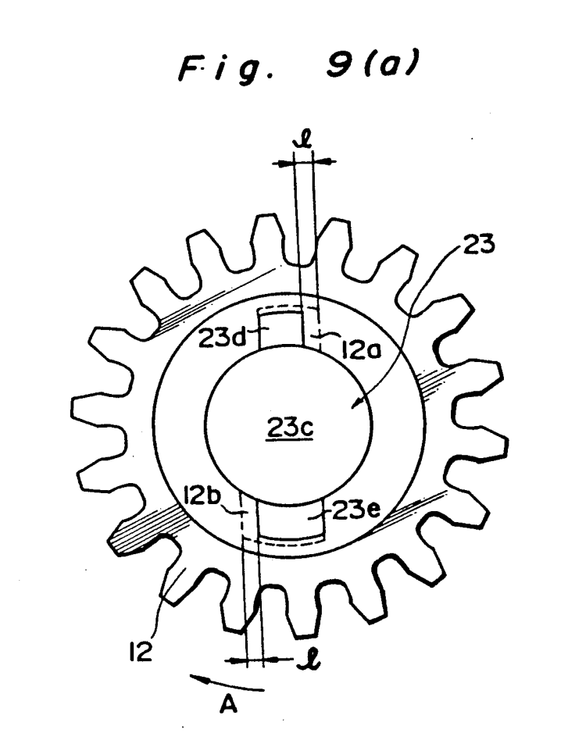
FIGS. 9(a) through 9(c) show the relationship between the viewfinder driving cam and the viewfinder driving gear serving as means for transmitting a driving force when a back focal distance compensation is carried out.
Figure 9B:
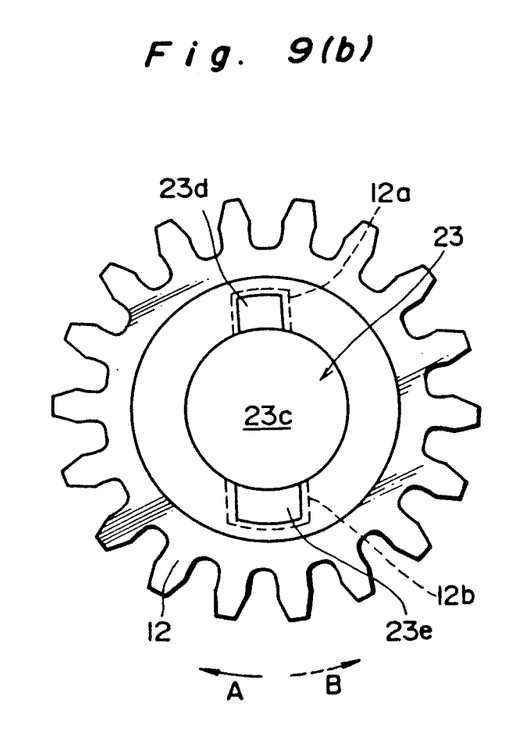
Figure 9C:
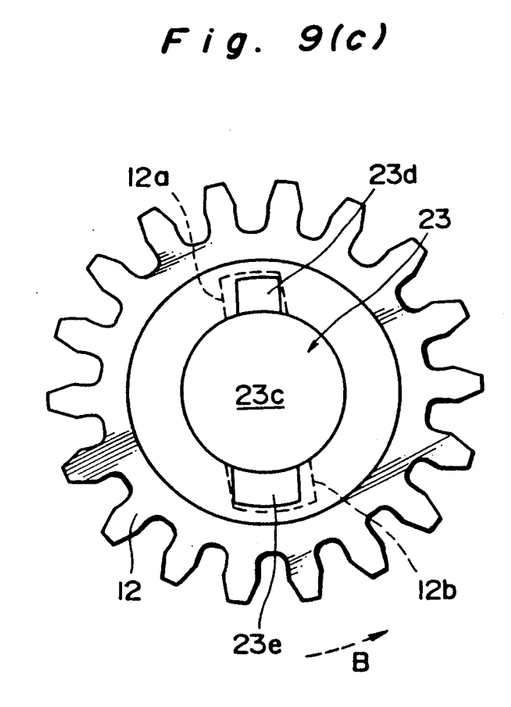

FIG. 2 is an exploded perspective view showing the detailed construction of the viewfinder block 20 of the embodiment. FIG. 3 is a plan view showing a viewfinder base 22 included in the viewfinder block 20. FIG. 4 is a view showing a first frame 21, partially in section, of the assembled viewfinder block 20 and a second frame 41 from which a cover 43 is removed. FIG. 5 through 7 are vertical longitudinal sectional views showing the operations of a system for driving the viewfinder lenses or zoom lenses 51 and 52 according to the conditions of the viewfinder driving gear 12. FIG. 8 shows a friction spring 60 mounted on a viewfinder driving cam 23. FIG. 9(a) through 9(c) show the relationship between the viewfinder driving cam 23 and the viewfinder driving gear 12 which provides for transmitting the driving force of the motor 7 when a back focal distance compensation is carried out. More specifically, FIG. 9(a) shows the condition in which the viewfinder driving gear 12 rotates in a direction shown by an arrow (A). FIG. 9(b) shows the condition in which the rotational direction of the viewfinder driving gear 12 is slightly reversed. FIG. 9(c) shows the condition in which the viewfinder driving gear 12 rotates in a direction shown by an arrow (B).

As shown best in FIG. 2, the viewfinder block 20 comprises the viewfinder base 22, the first frame 21 for accommodating movable viewfinder lenses 51 and 52 (shown in FIGS. 4 through 7) and other members, and a second frame 41 for accommodating a fixed roof mirror 53, a prism 55, lenses 54 and 56, and other members. Projections (not shown) for positioning the first frame 21 and second frame 41 are formed on the bottom surfaces thereof and openings 22cc, 22d, 22g, and 22i (shown in FIG. 3) into which the projections are inserted are formed at predetermined positions of the viewfinder base 22. Thus, the first and second frames 21 and 41 can be accurately positioned on the viewfinder base 22. The elongated openings 22g and 22i allow the second frame 41 to move therethrough forward and backward. The optical path length of the viewfinder optical system can be varied by the forward or backward movement of the second frame 41. Thus, a diopter can be adjusted.

The viewfinder lens driving system is mounted under the viewfinder base 22. The viewfinder lens driving system essentially comprises the viewfinder driving gear 12 and the viewfinder driving cam 23 interlocked with each other through keys. The viewfinder lens driving system is supported by the bent portion 22b disposed in the front of the viewfinder base 22 through a pin 25 inserted from the front face of the bent portion 22b into the front end of the cam 22 over which the viewfinder driving gear 12 is fitted. Describing the construction of the viewfinder driving gear 12 and the viewfinder driving cam 23 with reference to FIG. 9, the widths of a pair of keyways 12a and 12b of the viewfinder driving gear 12 are greater than those of keys 23d and 23e, of the viewfinder driving cam 23, which engage the keyways 12a and 12b. The keyways 12a and 12b of the viewfinder driving gear 12 are eccentric with each other. As shown in FIGS. 2 and 8, the viewfinder driving cam 23 comprises a rotation shaft 23c, a first cam face 23a (front cam face) and a second cam face 23b (rear cam face) formed around the rotation shaft 23c and composed of two helical slopes, respectively. A friction spring 60 is disposed between the first cam face 23a and the viewfinder driving gear 12 so that the friction spring 60 is mounted contractedly around the rotation shaft 23c of the viewfinder driving cam 23. If no load is applied to the friction spring 60, the friction spring 60 contracts. As a result, the inner diameter thereof becomes smaller than the diameter of the rotation shaft 23c of the viewfinder driving cam 23. That is, the friction spring 60 compresses the rotation shaft 23c. As shown in FIG. 8, arms 60a and 60b of the friction spring 60 are brought in contact with the bottom surface of the viewfinder base 22. Thus, the friction spring 60 does not rotate even when the viewfinder driving cam 23 rotates.

The viewfinder driving gear 10 for transmitting the driving force of the motor 7 to the lens barrel 1 comprises a large gear 10a and a small gear 10b. The large gear 10a serves for driving the lens barrel 1. The small gear 10b serves for driving the viewfinder lenses 51 and 52 through the idle gear 11, the viewfinder driving gear 12, and the viewfinder driving cam 23. A coil spring 24 is mounted around a narrow shaft 23g formed rearward of the viewfinder driving cam 23. The coil spring 24 is contracted between bent portion 22b' of the viewfinder base 22 and the rear face 23f of the viewfinder driving cam 23. The viewfinder driving cam 23 is brought into contact with the vertical bent portion 22b of the viewfinder base 22 because the coil spring 24 always urges the viewfinder driving cam 23 forward.

As shown in FIGS. 2 and 4, the first frame 21 accommodates a first lens holder 27 and a second lens holder 30 for movably holding the first viewfinder lens 51 and the second viewfinder lens 52, respectively. The first lens holder 27 and the second lens holder 30 are supported by guide shafts 28 and 29, respectively which extend between a supporting plate 31 fixed to the rear of the first frame 21 and the front of the first frame 21. A coil spring 26 is mounted around the guide shaft 28 so that the coil spring 26 is disposed between the first lens holder 27 and the front of the first frame 21. The coil spring 26 urges the first lens holder 27 backward. As a result, as shown in FIG. 5 through 7, a projection 27a formed on the bottom surface of the first lens holder 27 is brought into contact with the first cam face 23a of the viewfinder driving cam 23. A projection 30a formed on the bottom of the second lens holder 30 is brought into contact with the second cam face 23b of the viewfinder driving cam 23. One end portion of a coil spring 32 is fixed to a projection 30b formed on the bottom of the second lens holder 30 and the other end of the coil spring 32 is fixed to a engaging portion 22a formed on the vertical bent portion 22b disposed in the front end of the viewfinder base 22. Therefore, the second lens holder 30 is always urged forward by the coil spring 32 and moves along the second cam face 23b. The first cam face 23a and the second cam face 23b are spirally formed by a plurality of inclined faces around the rotation shaft of the viewfinder driving cam 23, respectively. The projection 30b of the second lens holder 30 holding the viewfinder lens 52 projects downward through a rectangular hole 22e formed on the viewfinder base 22 (shown in FIGS. 2 and 3). Thus, the second lens holder 30 is capable of moving along the rectangular hole 22e. The projection 30b of the second lens holder 30 is described later. A rectangular hole 22f formed on the side of the hole 22e allows the projection 27a of the first lens holder 27 and the projection 30a of the second lens holder 30 to move therethrough forward or rearward while contacting the cam faces 23a and 23b of the viewfinder driving cam 23. The projections 27a of the first lens holder 27 and the projection 30a of the second lens holder 30 will be described later.

As shown in FIGS. 2 and 4, a prism 55 is fixed to the second frame 41 by the urging force of a V-shaped leaf spring 44. A convex lens 54 mounted under pressure between the prism 55 and the roof mirror 53 is held by the second frame 41. A lens 56 mounted in the rear of the prism 55 is sandwiched between the second frame 41 and a frame-shaped member 45 as shown in FIG. 4. A cover 43 is mounted on the second frame 41 so as to prevent dust from penetrating thereinto. A thin transparent film 42 is mounted in the optical path connecting opening disposed between the first frame 21 and the second frame 41 so as to prevent the penetration of dust through the optical path connecting opening without affecting light passing through the viewfinder.

Figure 10:
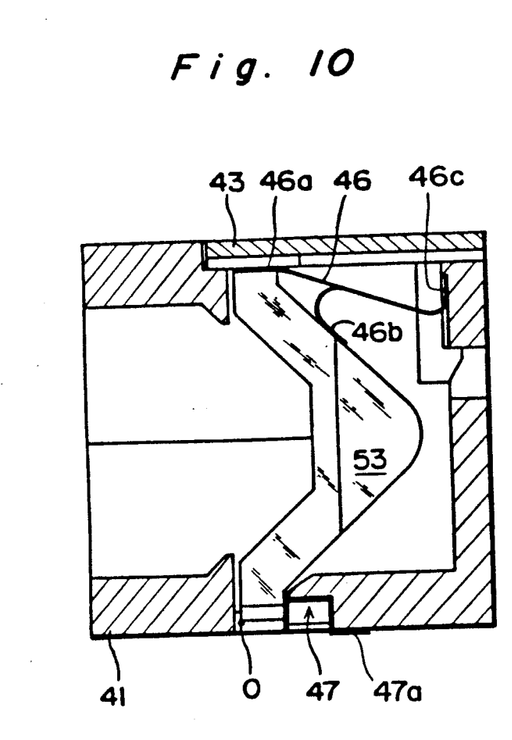
FIG. 10 is a vertical longitudinal sectional view showing a roof mirror which is mounted in the second frame.
Figure 11:
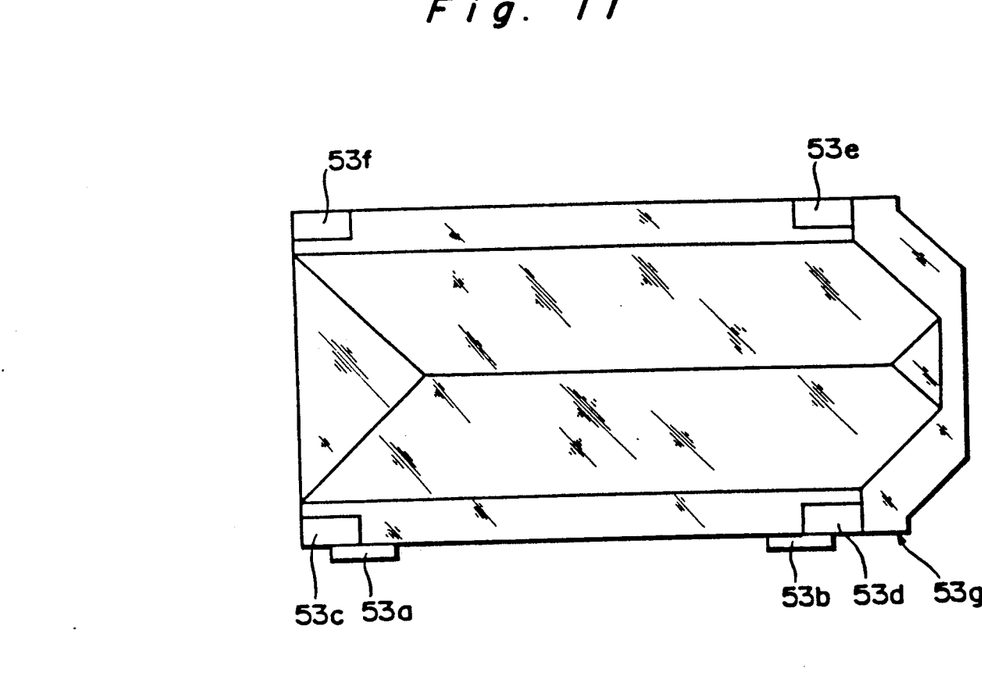
FIG. 11 is a front view of the roof mirror.
Figure 12:
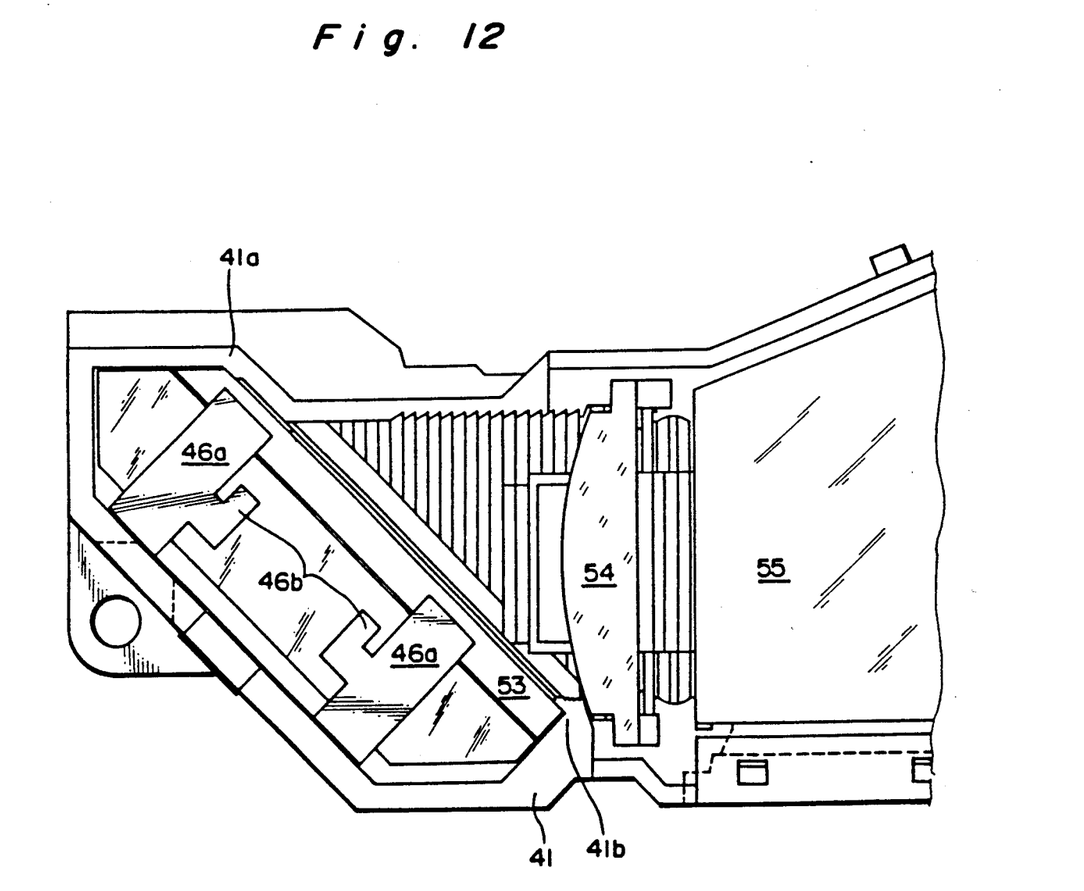
FIG. 12 shows a roof mirror fixing first spring which is mounted on the second frame.
Figure 13:
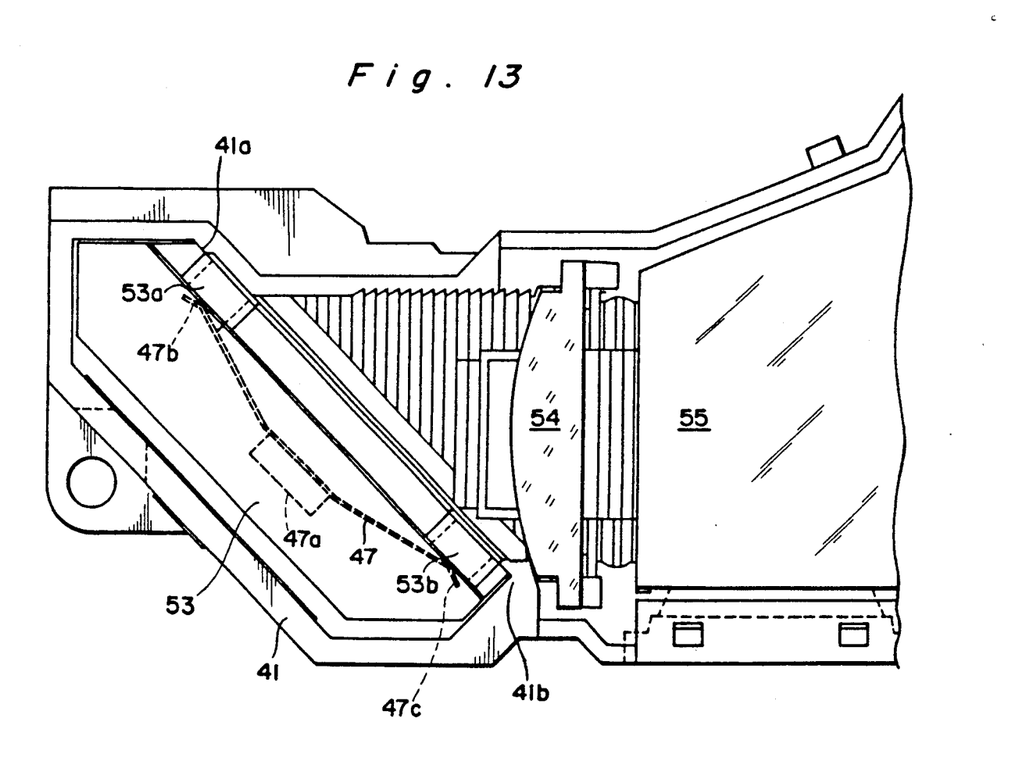
FIG. 13 shows a roof mirror fixing second spring which is mounted on the second frame.

FIG. 10 is a vertical longitudinal sectional view showing the roof mirror 53 which is mounted in the second frame 41. FIG. 11 is a front view of the roof mirror 53. FIG. 12 shows a roof mirror fixing first spring 46 mounted on the second frame 41. FIG. 13 shows a roof mirror fixing second spring 47 mounted on the second frame 41. The roof mirror 53 is mounted in the second frame 41 with a high positioning accuracy so that light which has passed through the viewfinder lenses 51 and 52 is reflected by the roof mirror 53 at an angle of 90° so as to guide the light to the prism 55. A first spring 46 and a second spring 47 are used to fix the roof mirror 53 to the second frame 41 as shown in FIGS. 12 and 13. The roof mirror 53 is arranged in the second frame 41 with the bottom surface 53g thereof contacted with the bottom surface of the second frame 41. The first springs 46 are fixed to the second frame 41 with the base portions 46c thereof contacted to the second frame 41 and have four contact portions including two portions 46a and two other portions 46b fixed to the roof mirror 53. The contact portions 46a compresses the top surface of the roof mirror 53 downward. The contact portions 46b compress the roof mirror 53 obliquely forward while contacting the inclined back surface of the roof mirror. 53. Consequently, the contact faces 53e and 53f of the roof mirror 53 contact with the contact faces 41a and 41b of the second frame 41. The second spring 47 has an engaging portion 47a, in the center thereof, to be engaged with the bottom surface of the second frame 41. Both ends 47b and 47c of the arms extending from the engaging portion 47a compress forward projections 53a and 53b respectively formed on the bottom of the front portion of the roof mirror 53. As a result, the contact faces 53c and 53d formed on the front face of the roof mirror 53 are brought into contact with the contact faces 41a and 41b of the second frame 41. Thus, the roof mirror 53 is fixedly supported by the second frame 41. Conventionally, the force by the spring is applied to the vicinity of the ridges of the roof mirror. In this case, the attitude or the faces of the roof mirror 53 may be undesirably varied against one's expectation.

The operations of the optical system of the viewfinder and the driving system thereof will be described hereinafter.

With the rotation of the motor 7, the driving force thereof is transmitted to the lens barrel 1 through the gears 8, 9, and 10 and also to the viewfinder driving gear 12 through the gear 10 and the idle gear 11. The zooming operation of the photographing optical system is carried out by moving the zoom barrel of the lens barrel 1 forward or rearward. Due to the rotation of the viewfinder driving gear 12, the viewfinder driving cam 23 rotates in the same direction. When the viewfinder driving gear 12 in the condition shown in FIG. 9(a) starts rotating in the direction shown by an arrow (A), the viewfinder driving cam 23 rotates simultaneously with the movement of the zoom barrel because the keys 23d and 23e of the viewfinder driving cam 23 are in contact with the inner walls of the keyways 12a and 12b, respectively. Subsequently, when the viewfinder driving gear 12 rotates in the direction shown by an arrow (B) in FIG. 9, the viewfinder driving cam 23 starts rotating after the viewfinder driving gear 12 has rotated a gap or play (l) between the key 23d, 23e and the inner wall of the keyways 12a, 12b. Accordingly, a lag occurs by the gap (l) between the rotational phases of the viewfinder driving gear 12 and the viewfinder driving cam 23. When the viewfinder driving cam 23 starts rotating, the projection 27a of the first lens holder 27 and the projection 30a of the second lens holder 30 are moved along the cam faces 23a and 23b, respectively. As a result, the first and second lens holders 27 and 30 move along the guide shafts 28 and 29, respectively. Thus, the positions of the viewfinder lenses 51 and 52 change as shown in FIGS. 5 through 7.

Next, the operation for performing the back focal distance compensation is described hereinbelow.

According to this embodiment, a back focal distance compensation is performed when the zooming operation is carried out based on the rotation of the viewfinder driving gear 12 in the direction shown by the arrow (B), i.e., when the zoom barrel 6 is moved backward. When the zoom barrel is moved forward, a back focal distance compensation is not carried out. That is, the back focal distance compensation is effected by making the position of the lens set when the zoom barrel is moved forward. Describing the operation to be performed when the zoom barrel is moved forward, simultaneously with the stop of the zoom barrel at a predetermined position, the rotation of the viewfinder driving gear 12 toward the (A) direction is stopped. Although there is a gap (l) between the viewfinder driving gear 12 and the inner wall of the viewfinder driving cam 23 in this stop-condition, the viewfinder driving cam 23 is not allowed to keep rotating even under the influences of its force of inertia and the elastic forces of the coil springs 26 and 32. This is because the friction spring 60 is brought into close contact with the viewfinder driving cam 23. Accordingly, the positions of the viewfinder lenses 51 and 52 are not varied when the zooming operation has been completed.

On the other hand, when the zoom barrel is moved backward and stopped at a predetermined position, the motor 7 is reversed for a short period of time thereafter. That is, the zoom barrel is driven to move forward by the motor 7 for a short period of time while the zoom barrel is moving backward. During that short period of time, the rotation direction of the viewfinder driving gear 12 is changed from the (B) direction to the (A) direction. The gap (l) is set to be a little greater than the rotational amount of the viewfinder driving gear 12 during the short period of time. Therefore, when the viewfinder driving gear 12 has rotated for the short period of time, the keys 23d and 23e of the viewfinder driving cam 23 do not contact with the inner walls of the keyways 12a and 12b, respectively. As described previously, the viewfinder driving cam 23 is not allowed to rotate, due to the spring 60, even under the influences of the force of its inertia and the elastic forces of the coil springs 26 and 32. Accordingly, the viewfinder driving cam 23 is not rotated when the zooming operation is stopped. Consequently, the positions of the viewfinder lenses 51 and 52 do not change. Thus, when the back focal distance compensation is performed, the position of the lens in the zoom barrel of the photographing optical system is altered. However, the positions of the viewfinder lenses 51 and 52 of the viewfinder optical system do not vary. Accordingly, an image condition viewed and set immediately before the rotation direction of the zoom barrel is changed is reliably maintained.

According to the camera of this embodiment provided with the zoom lens, the positions of the viewfinder lenses 51 and 52 can be prevented from being changed even though the zoom barrel is moved in compensating a back focal distance which has occurred by the operation of the zoom lens of the photographing optical system. Since the diameter of the viewfinder driving cam 23 is approximately the same as that of the viewfinder driving gear 12, the viewfinder driving cam 23 does not penetrate into the optical path of the viewfinder optical system and can be mounted below the lens holders 27 and 30. Thus, the viewfinder driving cam 23 does not interrupt the field of view. The springs 26 and 32 ensure the contacts of the lens holder 27 and 30 with the cam faces 23a and 23b of the viewfinder driving cam 23. Therefore, an error in the operation of the viewfinder lens driving system is caused by only the inaccuracy in manufacturing the projections 27a and 30a of the lens holders 27 and 30 and the first cam face 23a and the second cam face 23b. Further, since the contact of the viewfinder driving cam 23 with the vertical bent portion 22b of the viewfinder base 22 is ensured by the elastic force of the coil spring 24 and the viewfinder driving cam 23 is prevented from axially dislocating, the positions of the viewfinder lenses 51 and 52 can be prevented from varying. That is, there are very few parts of the viewfinder lens driving system required to be manufactured with a high accuracy. In addition, since the springs permit the viewfinder lenses and the viewfinder driving cam to be brought into contact with contact faces, there is no need for considering any error which may occur due to repeated operations.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A camera provided with zoom lenses comprising:
a photographing optical system having zoom lenses;
a viewfinder optical system having zoom lenses;

a driving motor for driving the zoom lenses of said photographing optical system and said viewfinder optical system;

first driving force transmitting means for transmitting the force of said driving motor to the zoom lenses of said photographing optical system;

back focal distance compensating means for compensating a back focal distance of the zoom lenses by reversing said driving motor slightly when an operation for moving the zoom lenses of said photographing optical system forward or backward is completed; and second driving force transmitting means for transmitting the force of said driving motor to the zoom lenses of said viewfinder optical system, which includes a driving member constructed to operate in unison with the zoom lenses of said viewfinder optical system so as to move the zoom lenses, driving force transmitting members for transmitting the force of said driving motor to said driving member, a predetermined play having been provided between said driving member and said driving force transmitting member, and restraining means for restraining said driving member from freely rotating while allowing said driving member to be driven by the force of said driving motor, whereby a slight amount of the reverse rotation of said driving motor to be made in the back focal distance compensation of the zoom lenses of said optical system is absorbed by said play so that the operation of said driving member restrained by said restraining means is prevented.

2. A camera as claimed in claim 1, wherein said driving member comprises a cam member; and said cam member moves the zoom lenses in cooperation with cam followers formed on lens holders holding the zoom lenses of said viewfinder optical system.

3. A camera as claimed in claim 2, wherein said cam member includes a rotation shaft portion to be rotated by said driving force transmitting members; and a cylindrical cam portion which is formed in the periphery of said rotation shaft portion and both end faces of which are constructed as cam faces which are brought into contact with the cam followers of said respective lens holders; and further comprising spring means for constantly and elastically pressing said respective lens holders against the corresponding cam faces of said cylindrical cam portion.

4. A camera as claimed in claim 3, wherein said restraining means comprises a friction member restraining the rotation of said cam member.

5. A camera as claimed in claim 4, wherein said friction member is a friction spring.

6. A camera as claimed in claim 3, wherein said cam member is provided with a key projectingly formed from a predetermined end of the periphery of the rotation shaft portion thereof;

the driving force transmitting members of said second driving force transmitting means comprise a gear train;

a last gear of said gear train is mounted around the predetermined end portion of the rotation shaft portion of said cam member and has a key groove which engages said key; and said play is provided between said key groove and said key.

7. A camera provided with zoom lenses comprising:

a photographing optical system having zoom lenses; and a viewfinder optical system having zoom lenses interlocked with said zoom lens of said photographing optical system, said viewfinder optical system having:

a pair of lens holders holding a pair of zoom lenses disposed forward and backward and having cam followers;

a cam member, for moving said respective lens holders together with the zoom lenses in the direction of an optical axis of said viewfinder optical system, having a rotation shaft to which a rotation driving force is transmitted; and a cylindrical cam portion formed on the longitudinal periphery of the rotation shaft and having forward and rearward helical cam faces on opposite ends of said cam member, the forward and rearward helical cam faces cooperating with the cam followers of said respective lens holders;

first biasing means for elastically urging the cam follower of the forward lens holder to be brought into contact with the forward helical cam face of said cam member; and second biasing means for elastically urging the cam follower of the backward lens holder to be brought into contact with the rearward helical cam face of said cam member.

8. A camera as claimed in claim 7, wherein the cam faces of said cam member determine an interval between said first and second lens holders in the direction of the optical axis of said viewfinder optical system.

9. A camera as claimed in claim 7 further comprising a viewfinder base having first and second vertical portions, said rotation shaft being rotatably supported therebetween in the direction of the optical axis of said viewfinder optical system, and third biasing means for biasing said rotation shaft against said first vertical portion.

* * * * *